United States Patent
Jaradi et al.

(10) Patent No.: US 12,179,693 B2
(45) Date of Patent: Dec. 31, 2024

(54) LOAD LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 17/932,396

(22) Filed: Sep. 15, 2022

(65) Prior Publication Data

US 2024/0092312 A1 Mar. 21, 2024

(51) Int. Cl.
*B60R 22/34* (2006.01)

(52) U.S. Cl.
CPC .................. *B60R 22/341* (2013.01)

(58) Field of Classification Search
CPC .............. B60R 22/341; B60R 22/3413; B60R 22/4676; B60R 2022/288
See application file for complete search history.

(56) References Cited

U.S. PATENT DOCUMENTS

| | | | |
|---|---|---|---|
| 6,789,761 B2 * | 9/2004 | Glinka | B60R 22/3413 242/381 |
| 7,686,339 B2 | 3/2010 | Rogers | |
| 10,369,962 B2 | 8/2019 | Faruque et al. | |
| 10,632,963 B2 | 4/2020 | Faruque et al. | |
| 2011/0121120 A1 * | 5/2011 | Ogawa | B60R 22/4676 242/379.1 |
| 2018/0319362 A1 * | 11/2018 | Faruque | F16F 9/30 |
| 2018/0319363 A1 * | 11/2018 | Faruque | B60R 22/405 |

* cited by examiner

*Primary Examiner* — Sang K Kim
(74) *Attorney, Agent, or Firm* — Frank A. Mackenzie; Bejin Bieneman PLC (57) ABSTRACT

A vehicle includes a seatbelt retractor including a housing and a spool rotatably supported by the housing. The seatbelt retractor includes a load limiter fixed to the spool and lockable with the housing. The load limiter has a first coupling and a second coupling spaced from the first coupling on the rotational axis. The first coupling has a first energy absorber retained in a first cavity. The first energy absorber is compressible relative to a first male segment and a first female segment of the coupling. The second coupling has a second energy absorber retained in a second cavity. The second energy absorber is compressible relative to a second male segment and a second female segment of the second coupling.

16 Claims, 8 Drawing Sheets

LOAD LIMITING SEATBELT RETRACTOR

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band.

DETAILED DESCRIPTION

With reference to the Figures, where like numerals indicate like elements, a vehicle 10 includes a seatbelt retractor 12. The seatbelt retractor 12 includes a housing 14 and a spool 16 rotatably supported by the housing 14 on a rotational axis R. The seatbelt retractor 12 includes a load limiter 18 fixed to the spool 16 and lockable with the housing 14. The load limiter 18 is on the rotational axis R. The load limiter 18 has a first coupling 20 and a second coupling 22 spaced from the first coupling 20 on the rotational axis R. The first coupling 20 has a first male segment 24 and a first female segment 26 receiving the first male segment 24 defining a first cavity 28 therebetween. The first male segment 24 and the first female segment 26 are moveable relative to each other along the rotational axis R. The first coupling 20 has a first energy absorber 30 retained in the first cavity 28. The first energy absorber 30 is compressible relative to the first male segment 24 and the first female segment 26. The second coupling 22 has a second male segment 32 and a second female segment 34 receiving the second male segment 32 defining a second cavity 36 therebetween. The second male segment 32 and the second female segment 34 are moveable relative to each other along the rotational axis R. The second coupling 22 has a second energy absorber 38 retained in the second cavity 36. The second energy absorber 38 is compressible relative to the second male segment 32 and the second female segment 34.

The spool 16 rotates relative to the housing 14. A webbing 40 is supported on the spool 16. Specifically, the webbing 40 is wrapped around the spool 16 and the webbing 40 is extended from and retractable to the spool 16 by rotating the spool 16 relative to the housing 14. Since the load limiter 18 is fixed to the spool 16, at least one end of the load limiter 18 rotates with the spool 16 relative to the housing 14. Specifically, the seatbelt retractor 12 may be changed between an unlocked position and a locked position. In the unlocked position, the load limiter 18 is free to rotate relative to the housing 14 such that the spool 16 and the load limiter 18 rotate together relative to the housing 14. In the locked position, the load limiter 18 is locked relative to the housing 14. As an example, during a vehicle 10 impact the seatbelt retract is in the locked position and the occupant urges the webbing 40 to extend from the spool 16, which exerts rotational force on the load limiter 18 while the load limiter 18 is locked relative to the housing 14. The first coupling 20 and the second coupling 22 receive this rotational force and one or both of the first coupling 20 and the second coupling 22 rotate to pay out webbing 40 for load limiting. Specifically, at rotational forces sufficient to overcome resistance of the energy absorber 30, 38, the male segment 24, 32 and the respective female segment 26, 34 rotate relative to each other, compressing the respective energy absorber 30, 38 therebetween, and paying out webbing 40 from the spool 16. In some examples, as described further below, the first coupling 20 and the second coupling 22 are designed to have different resistance to the rotational force (e.g., the first energy absorber 30 and the second energy absorber 38 may have different characteristics), which provides progressive load limiting. In other words, one of the first coupling 20 and the second coupling 22 allows for payout of webbing 40 at a relatively lower threshold rotational force and the other of the first coupling 20 and the second coupling 22 allows for payout of webbing 40 at a relatively higher threshold rotational force. In some examples, the first coupling 20 and the second coupling 22 may be resettable, i.e., may return to the pre-stressed position when force on the webbing 40 is relieved.

The vehicle 10 may be any suitable type of ground vehicle 10, e.g., a passenger or commercial automobile such as a sedan, a coupe, a truck, a sport utility, a crossover, a van, a minivan, a taxi, a bus, etc. The vehicle 10 includes a vehicle frame and a vehicle body. The vehicle body may be of unitary construction, in which the vehicle frame is unitary with the vehicle body including frame rails, rockers, pillars, roof rails, etc. As another example, the vehicle body and vehicle frame may have a body-on-frame construction (also referred to as a cab-on-frame construction) in which the vehicle body (including rockers, pillars, roof rails, etc.) and vehicle frame are separate components, i.e., are modular, and the vehicle body is supported on and affixed to the vehicle frame. Alternatively, the vehicle frame and vehicle body may have any suitable construction. The vehicle frame and the vehicle body may be of any suitable material, for example, steel, aluminum, and/or fiber-reinforced plastic, etc.

The vehicle frame and/or the vehicle body defines a passenger compartment to house occupants of the vehicle 10. The passenger compartment may extend across the vehicle 10, i.e., from one side to the other side of the vehicle 10.

The vehicle 10 may include one or more seats. Specifically, the vehicle 10 may include any suitable number of seats 42. The seats 42 are supported by the vehicle floor. The seats 42 may be arranged in any suitable arrangement in the passenger compartment. As in the example shown in the Figures, one or more of the seats 42 may be at the front end of the passenger compartment, e.g., a driver seat and/or a passenger seat. In other examples, one or more of the seats 42 may be behind the front end of the passenger compartment, e.g., at the rear end of the passenger compartment. The seats 42 may be movable relative to the vehicle floor to various positions, e.g., movable fore-and-aft and/or cross-vehicle. The seat 42 may be of any suitable type, e.g., a bucket seat.

Figure 1:
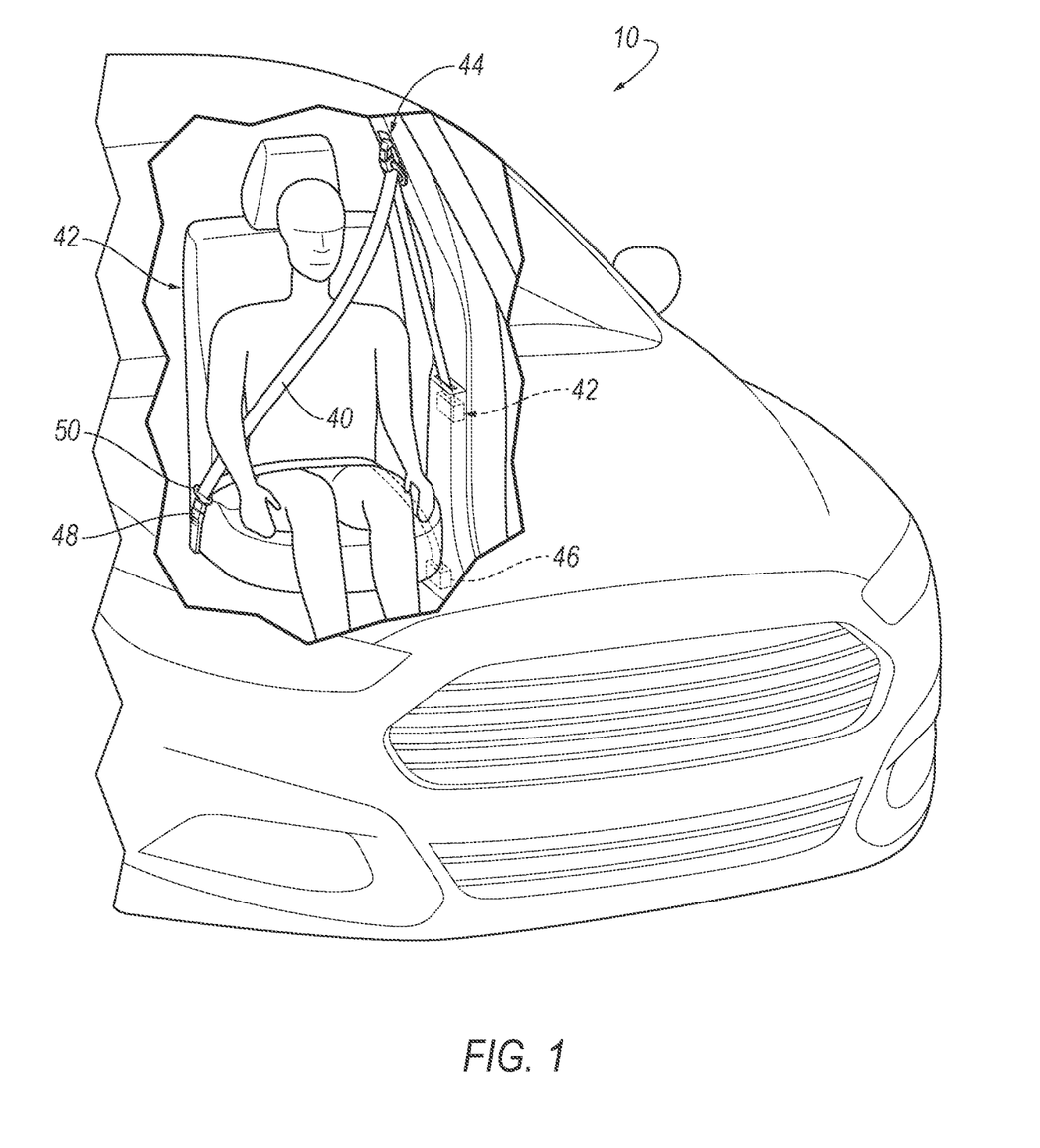
FIG. 1 is a perspective view of a vehicle with a seatbelt assembly including a seatbelt retractor.
Figure 2:
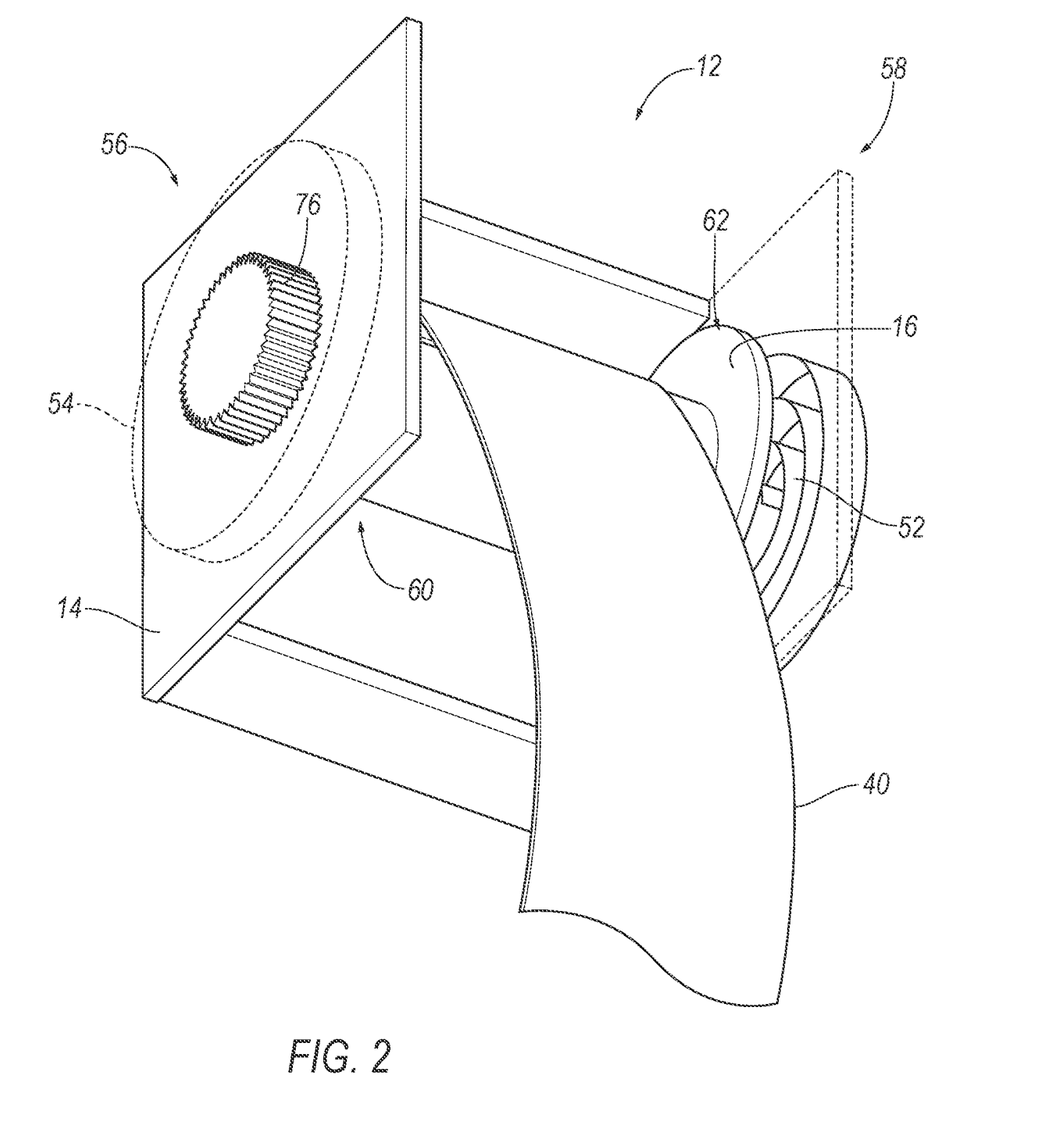
FIG. 2 is a perspective view of the retractor and webbing extending from the retractor.
Figure 3:
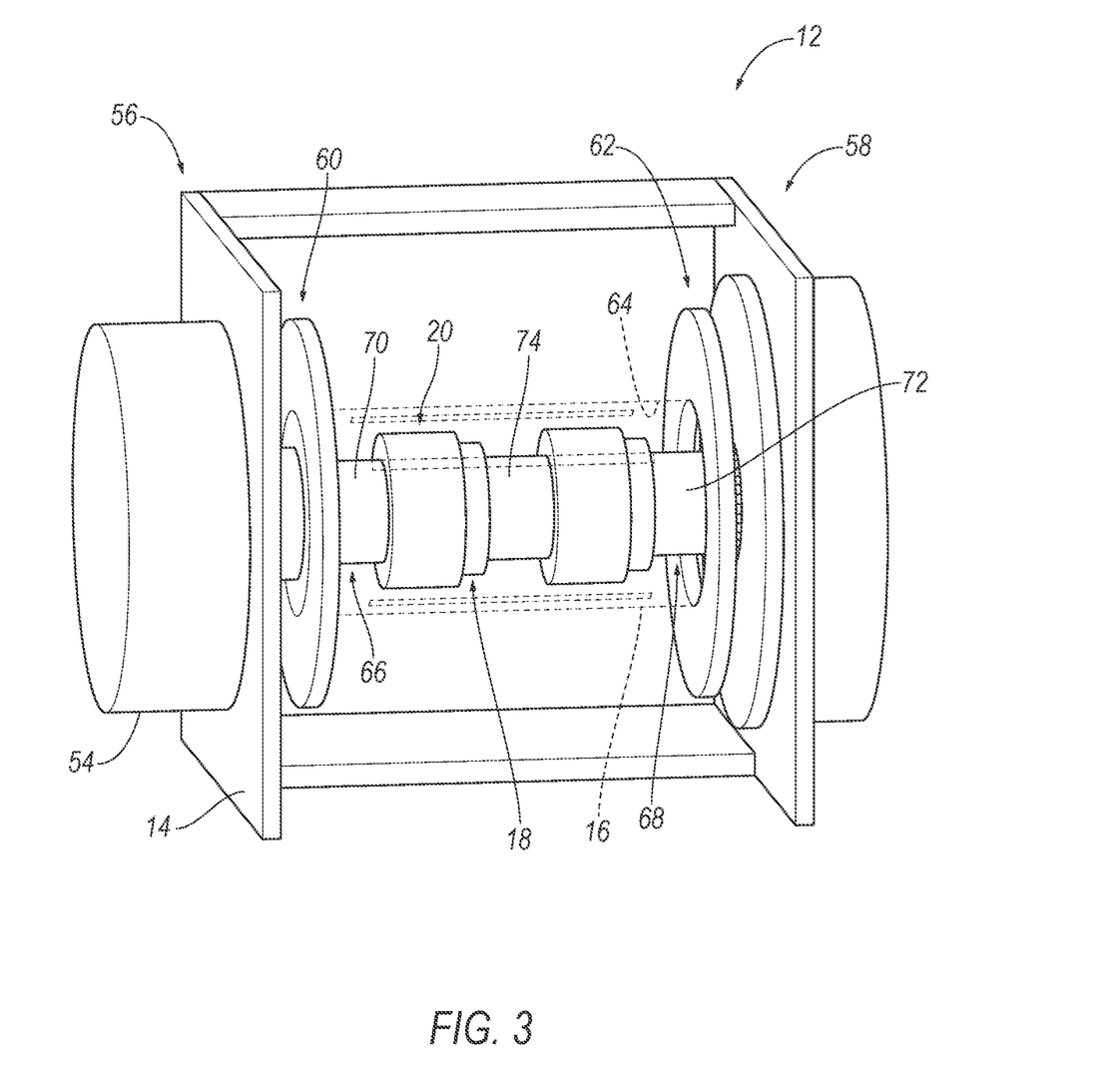
FIG. 3 is a perspective view of the retractor absent the webbing and with a spool of the retractor shown in broken lines to show a load limiter.
Figure 4A:
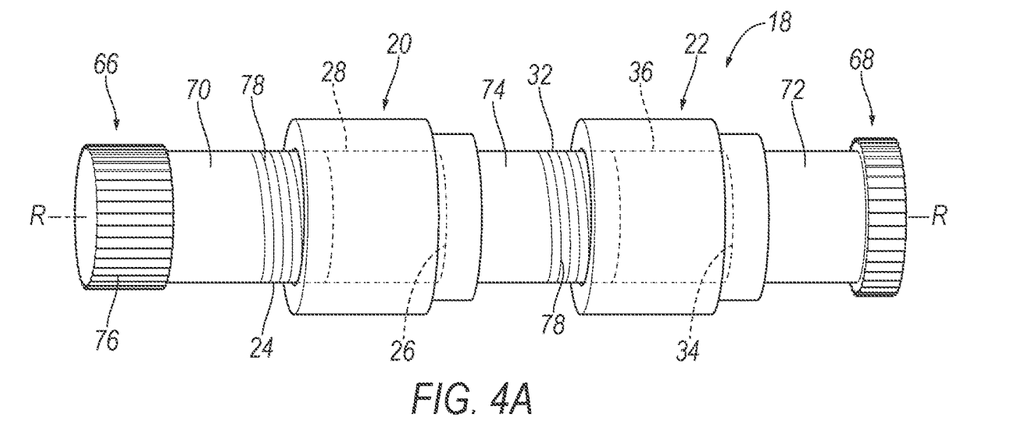
FIG. 4A is a perspective view of the load limiter at rest.
Figure 4B:
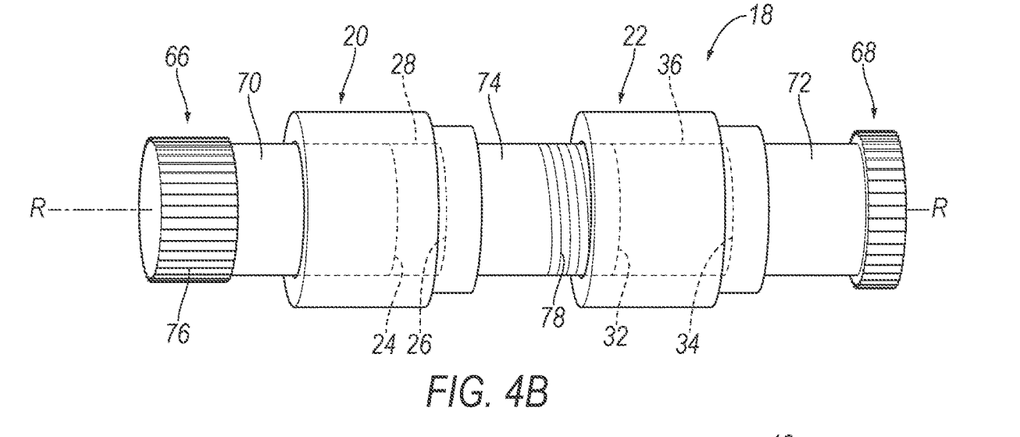
FIG. 4B is a perspective view of the load limiter with a first coupling of the load limiter in a compressed position.
Figure 4C:
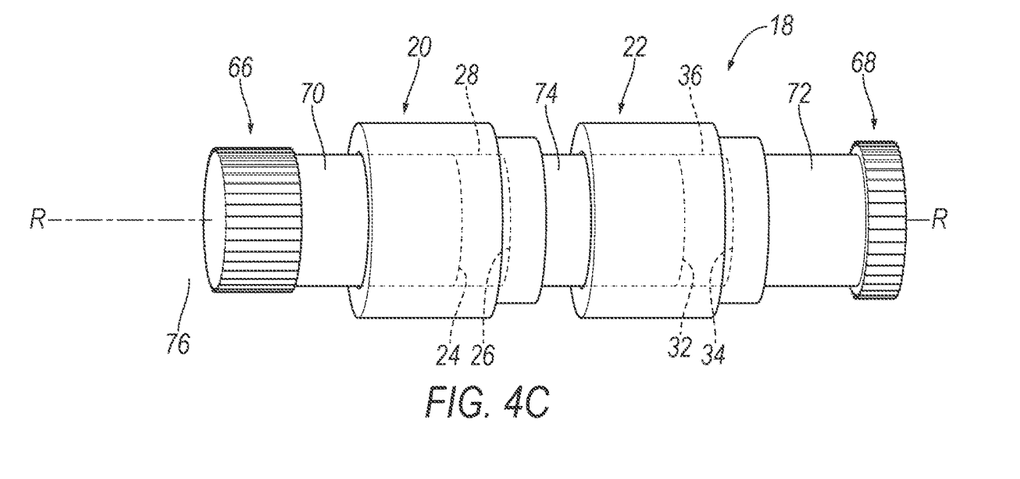
FIG. 4C is a perspective view of the load limiter with the first coupling and a second coupling of the load limiter in a compressed position.

With reference to FIGS. 1 and 2, the vehicle 10 includes a seatbelt assembly 44 including the seatbelt retractor 12 and the webbing 40. Specifically, the vehicle 10 may include any suitable number of seatbelt assemblies 44, e.g., one seatbelt assembly 44 for each seat 42. The seatbelt assembly 44 may be disposed adjacent the respective seat 42.

The seatbelt assembly 44 may be supported by the vehicle body. For example, the seatbelt retractor 12 may be supported by one of the pillars of the vehicle body. In the example shown in the Figures, the seatbelt assembly 44 is supported by and fixed to the B-pillar of the vehicle body and in other examples may be supported by and fixed to any suitable pillar, e.g., a C-pillar or a D-pillar. The seatbelt assembly 44 may include an anchor 46 fixed to the webbing 40 and fixed to the vehicle body. In other examples, the seatbelt assembly 44 may be supported by the seat 42.

The seatbelt assembly 44 may include a buckle 48 and a clip 50 that releasably engages the buckle 48. The seatbelt assembly 44 may be a three-point harness, meaning that the webbing 40 is attached at three points around the occupant when fastened: the anchor 46, the seatbelt retractor 12, and the clip 50/buckle 48. The seatbelt assembly 44 may, in other examples, include another arrangement of attachment points.

The webbing 40 is coiled about the spool 16. The webbing 40 may be fabric, e.g., polyester. The clip 50 slides freely along the webbing 40 and, when engaged with the buckle 48, divides the webbing 40 into a lap band and a shoulder band.

The seatbelt retractor 12 includes the housing 14. The spool 16 selectively rotatable relative to the housing 14 about the rotational axis R. The housing 14 is fixed relative to the rest of the vehicle 10 and the spool 16 is rotatable relative to the housing 14 to pay out and retract the webbing 40 relative to the spool 16. The spool 16 may be spring-loaded relative to the housing 14, e.g., with a spring 52 between the spool 16 and the housing 14, to automatically retract slack from the webbing 40.

The seatbelt retractor 12, e.g., the spool 16, may be lockable from an unlocked position to a locked position, e.g., with a locking device (generally identified with reference numeral 54) moveable relative to the load limiter 18 between the unlocked position and the locked position, as described further below. Specifically, the load limiter 18 is lockable with the housing 14 to lock an end of the load limiter 18 relative to the housing 14 in the locked position, as described further below. In the unlocked position, the seatbelt webbing 40 may be extended from and retracted into the seatbelt retractor 12. In other words, the seatbelt webbing 40 may be coiled and uncoiled freely about the spool 16. In the locked position, the seatbelt retractor 12 controls extension of the seatbelt webbing 40 to control the kinematics of the occupant. Specifically, the spool 16 is locked relative to the housing 14, as described further below, and the spool 16 then acts on the load limiter 18. In such a scenario, when rotational force exerted on the spool 16 about the rotational axis R exceeds a threshold rotational force of the load limiter 18, the load limiter 18 allows for payout of the webbing 40 from the seatbelt retractor 12. The seatbelt retractor 12 may be in the unlocked position by default, i.e., in the absence of a sudden deceleration. The seatbelt retractor 12 may change from the unlocked position to the locked position during a sudden deceleration of the vehicle 10, i.e., the deceleration may trigger components of the seatbelt retractor 12, e.g., the locking device 54, to change from the unlocked position to the locked position, e.g., the spool 16.

The housing 14 has a first end 56 and a second end 68 58 spaced from the first end 56 along the rotational axis R. The housing 14 may be of any suitable size and shape. The housing 14 may be of any suitable material, e.g., plastic, metal, composite, etc.

The seatbelt retractor 12 includes the spool 16. As shown in the Figures, the spool 16 has a first end 60 and a second end 68 62 and is elongated along the rotational axis R from the first end 60 of the spool 16 to the second end 68 62 of the spool 16.

The spring 52 may be coupled to the spool 16 and the housing 14. In the example shown in the Figures, the spring 52 is disposed at the second end 68 of the housing 14. Specifically, the spring 52 is engaged with the second end 68 62 of the spool 16 to retract the webbing 40. The spring 52 may be loaded in tension or compression when the webbing 40 is fully retracted, and the spring 52 may be further loaded in either tension or compression when the webbing 40 is extended from the spool 16. When the occupant exerts a force on the webbing 40, the spring 52 uncoils and the webbing 40 is extended from the spool 16. When the force of the occupant on the webbing 40 is released, no rotational force is exerted on the spool 16 and the spring exerts a force tending to retract the webbing 40. The spring 52 may be, for example, a spiral torsion spring or any other suitable type of spring.

The spool 16 is rotatably supported by the housing 14 on the rotational axis R. The spool 16 rotates relative to the housing 14 as the webbing 40 is extended from and retracted to the housing 14. The first end 60 of the spool 16 is adjacent the first end of the housing 14. The first end 60 of the spool 16 is fixed to the load limiter 18 and the load limiter 18 is rotatably supported by the housing 14 (as described further below), i.e., the first end of the spool 16 rotates as a unit with the load limiter 18 at the first end of the spool 16. The first end 60 of the spool 16 is supported on the load limiter 18 at the first end 60 of the spool 16. Specifically, the first end 60 of the spool 16 is supported by the housing 14 through the load limiter 18. The second end 68 62 of the spool 16 is adjacent the second end 68 58 of the housing 14. The second end 68 62 of the spool 16 is radially spaced from the load limiter 18. The second end 68 62 of the spool 16 is rotatable relative to the load limiter 18 during operation of the load limiter 18, as described further below. The second end 68 62 of the spool 16 may be supported by the housing 14 with bearings that allow free rotation of the second end 68 62 relative to the housing 14.

The spool 16 includes a cavity 64. The cavity 64 is elongated along the rotational axis R. The load limiter 18 is disposed in the cavity 64. As described below, the load limiter 18 extends through the cavity 64, i.e., the spool 16 surrounds the load limiter 18. Specifically, the load limiter 18 is fixed to the first end 60 of the spool 16 in the cavity 64. The spool 16 is radially spaced from the load limiter 18 in the cavity 64. The spool 16 may be of any suitable material, e.g., plastic, metal, composite, etc.

The load limiter 18 has a first end 66 and a second end 68 and is elongated along the rotational axis R from the first end 66 of the load limiter 18 to the second end 68 of the load limiter 18. The load limiter 18 includes a first member 70, a second member 72, and at least one intermediate member 74 between the first member 70 and the second member 72. The first member 70 includes the first end 66 of the load limiter 18 and the second member 72 includes the second end 68 of the load limiter 18. The load limiter 18 includes at least two couplings 20, 22 on the rotational axis R between the first end 66 of the load limiter 18 and the second end 68 of the load limiter 18. In the example shown in the figures, the load limiter 18 includes one coupling, namely a first coupling 20, between the first member 70 and the intermediate member 74 and one coupling, namely a second coupling 22, between the second member 72 and the intermediate member 74.

The load limiter 18 is on the rotational axis R. Specifically, the load limiter 18 is elongated from the first end 66 of the load limiter 18 to the second end 68 of the load limiter 18 on the rotational axis R. The first member 70, the second member 72, the intermediate member 74, and the couplings 20, 22 are on the rotational axis R. As shown in the Figures, the load limiter 18 is elongated between at least the first end 60 of the spool 16 and the second end 68 62 of the spool 16.

The load limiter 18 is fixed to the spool 16. Specifically, the first member 70 of the load limiter 18 is fixed to the spool 16. The first member 70 is fixed to the spool 16 at the first end 66 of the load limiter 18. In other words, the first end 66 of load limiter 18 rotates with the spool 16 about the rotational axis R during payout and retraction of the webbing 40 from the spool 16. As set forth further below, the first end 66 of the load limiter 18 is rotatable relative to the second end 68 of the load limiter 18, i.e., when the male segment 24, 32 and female segment 26, 34 of the respective coupling 20, 22 rotated relative to each other, to allow the spool 16 to rotate relative to the second end 68 of the load limiter 18 and the housing 14 to payout a limited about of webbing 40, e.g., during a vehicle impact. The first end 66 of the load limiter 18 may be fixed to the spool 16 in any suitable manner, e.g., a splined connection, welding, adhesive, etc.

The load limiter 18 is lockable with the housing 14. Specifically, the second end 68 of the load limiter 18 is lockable with the housing 14. When the second end 68 of the load limiter 18 is unlocked from the housing 14, the second end 68 of the load limiter 18 is rotatable relative to the housing 14. The spool 16 and the load limiter 18 are rotatable relative to the housing 14 to pay out and retract webbing 40 when the second end 68 of the load limiter 18 is unlocked. When the second end 68 of the load limiter 18 is locked with the housing 14, the second end 68 is immovable relative to the housing 14. The spool 16 loads the load limiter 18 when the second end 68 of the load limiter 18 is locked to the housing 14 and force is exerted on the webbing 40 to extend the webbing 40, e.g., during a vehicle impact.

As an example, the seatbelt retractor 12 includes the locking device 54 between the housing 14 and the second member 72, specifically between the housing 14 and the second end 68. The locking device 54 is moveable between the unlocked position and the locked position. The housing 14 supports the locking device 54. The locking device 54 may support the second end 68 of the load limiter 18 on the housing 14. In the unlocked position the locking device 54 allows the second end 68 of the load limiter 18 to rotate about the rotational axis R relative to the housing 14 and in the locked position the locking device 54 prevents rotation of the load limiter 18 relative to the housing 14.

The locking device 54 may be of a type known in the art and may be triggered in any suitable manner. As one example, the locking device 54 may engage the load limiter 18 in response to deceleration of the vehicle 10, e.g., a sudden slowing of the vehicle 10, sudden stop, vehicle 10 impact, etc. In other words, the locking device 54 may be moved from the unlocked position to the locked position by a change in inertia. The locking device 54 may engage the load limiter 18 in response to an activation sensor (not shown). The activation sensor senses sudden deceleration of the vehicle 10 and triggers activation of the locking device 54, i.e., moves the locking device 54 to the locked position. As one example, the activation sensor may be in the seatbelt retractor 12 and may be, for example, a weighted pendulum, a centrifugal clutch, or any other suitable type.

The locking device 54 includes a lock that locks and unlocks with the second end 68 of the load limiter 18. As an example shown in the Figures, the second end 68 of the load limiter 18 may include teeth 76 and the locking device 54 may include a pawl that releasably engages the teeth 76. Specifically, the activation sensor, when triggered, moves the pawl into engagement with the teeth 76. The activation sensor triggers the pawl to disengage the teeth 76 to selectively release the locking device 54 from the locked position to the unlocked position in response to predetermined activity, e.g., by a change in inertia.

As described above, the load limiter 18 has at least two couplings 20, 22. Each coupling 20, 22 includes one female segment 26, 34, one male segment 24, 32 threadedly engaged with the female segment 26, 34, and at least one energy absorber 30, 38 between the female segment 26, 34 and the male segment 24, 32.

The couplings 20, 22 are between the first member 70 and the second member 72. Accordingly, the couplings 20, 22 allow for relative rotation of the first member 70 and the second member 72 when the couplings 20, 22 are loaded above a threshold rotational force, as described further below. In the example shown in the Figures, the load limiter 18 includes two couplings 20, 22. In other examples, the load limiter 18 may include more than two couplings 20, 22.

The couplings 20, 22 are spaced from each other along the rotational axis R. In the example shown in the Figures, the intermediate member 74 is between the first coupling 20 and the second coupling 22. In this example, the first coupling 20 is between the intermediate member 74 and the first member 70 of the load limiter 18 and the second coupling 22 is between the intermediate member 74 and the second member 72 of the load limiter 18. In examples including more than two couplings 20, 22, the load limiter 18 includes more than one intermediate member 74.

The first member 70, the second member 72, and the intermediate member 74 may be of any suitable size, shape, and/or material type. Specifically, the first member 70, the second member 72, and the intermediate member 74 may be designed to (i.e., of size, shape, and material type) to have a rotational yield strength above the compressive load threshold of the energy absorbers 30, 38 of the couplings 20, 22 so that first member 70, the second member 72, and the intermediate member 74 transmit force from the second end 68 of the load limiter 18 to the energy absorber 30, 38s of the couplings 20, 22 the locking device 54 locks the second end 68 of the load limiter 18 to the housing 14.

The female segment 26, 34 of the coupling 20, 22 receives the male segment 24, 32 of the coupling 20, 22. In other words, the male segment 24, 32 of the coupling 20, 22 extends into the female segment 26, 34 of the coupling 20, 22. The female segment 26, 34 and the respective male segment 24, 32 define the cavity 28, 36 therebetween. The energy absorber 30, 38 is disposed in the respective cavity 28, 36.

The male segment 24, 32 and the female segment 26, 34 are threadedly engaged. Specifically, the male segment 24, 32 include a thread 78 and the female segment 26, 34 includes thread threadedly engaged with the thread 78 of the male segment 24, 32. The threads 78 are designed to allow for relative rotation and translation of the male segment 24, 32 into the female segment 26, 34 when rotational force applied to the coupling 20, 22 exceeds the compressive load threshold of the energy absorber 30, 38, i.e., during a vehicle impact. The design of the threads 78 may allow for free rotation and translation of the male segment 24, 32 away from the respective female segment 26, 34 when rotational forces applied to the coupling 20, 22 are below the compressive load threshold of the respective energy absorber 30, 38, i.e., so that the load limiter 18 is resettable.

In the example shown in the Figures, one of the male segment 24 and the female segment 26 of the first coupling 20 is on the first member 70 and the other of the male segment 24 and the female segment 26 is on the intermediate member 74. In such an example, the one of the male segment 24 and the female segment 26 of the first coupling 20 is unitary with the first member 70 and the other of the male segment 24 and the female segment 26 is unitary with the intermediate member 74, i.e., a single, uniform piece of material with no seams, joints, fasteners, or adhesives holding it together. The unitary components are formed together simultaneously as a single continuous unit, e.g., by machining from a unitary blank, molding, forging, casting, etc. In other examples, the one of the male segment 24 and the female segment 26 may be non-unitary with the first member 70 and the other of the male segment 24 and the female segment 26 may be non-unitary with the intermediate member 74, i.e., formed separately and subsequently assembled, e.g., by threaded engagement, welding, adhesive, etc. In the example shown in the Figures, the male segment 24 of the first coupling 20 is on the first member 70 and the female segment 26 of the first coupling 20 is on the intermediate member 74.

In the example shown in the Figures, one of the male segment 32 and the female segment 34 of the second coupling 22 is on the second member 72 and the other of the male segment 32 and the female segment 34 is on the intermediate member 74. In such an example, the one of the male segment 32 and the female segment 34 of the second coupling 22 is unitary with the second member 72 and the other of the male segment 32 and the female segment 34 is unitary with the intermediate member 74. In other examples, the one of the male segment 32 and the female segment 34 may be non-unitary with the second member 72 and the other of the male segment 32 and the female segment 34 may be non-unitary with the intermediate member 74, i.e., formed separately and subsequently assembled, e.g., by threaded engagement, welding, adhesive, etc. In the example shown in the Figures, the male segment 32 of the second coupling 22 is on the intermediate member 74 and the female segment 34 of the second coupling 22 is on the second member 72.

As set forth above, the coupling 20, 22 includes the energy absorber 30, 38. In the example shown in the Figures, the first coupling 20 includes the first energy absorber 30 and the second coupling 22 includes the second energy absorber 38. The energy absorber 30, 38 is compressed when subjected to a compressive load between the respective male segment 24, 32 and the female segment 26, 34 that exceeds the compressive load threshold of the energy absorber 30, 38. When the second end 68 of the load limiter 18 is locked to the housing 14 and force is exerted on the webbing 40 to pay out from the spool 16, e.g., during a vehicle impact, the force on the webbing 40 generates rotational force at the second end 68 of the load limiter 18. When the rotational force exceeds a rotational force threshold of the coupling 20, 22, i.e., results in compressive load on the respective energy absorber 30, 38 between the respective male segment 24, 32 and the female segment 26, 34 that exceeds the compressive load threshold of the respective energy absorber 30, 38, the male segment 24, 32 is rotated into the female segment 26, 34 to compress the energy absorber 30, 38 and pays out a limited about of webbing 40. As described further below, the energy absorber 30, 38 may be resettable such that, when the rotational force on the second end 68 of the load limiter 18 is released, the energy absorber 30, 38 forces the male segment 24, 32 to retreat from the female segment 26, 34 to the position before the application of the rotational force that exceeded the rotational force threshold.

The energy absorber 30, 38 is compressible from an original state, e.g., an uncompressed state in the example shown in the Figures, to a compressed state when the rotational force on the second end 68 of the load limiter 18 exceeds the rotational force threshold. Specifically, the energy absorber 30, 38 is compressible relative to the male segment 24, 32 and the female segment 26, 34, i.e., the energy absorber 30, 38 reduces in volume when compressed between the male segment 24, 32 and the female segment 26, 34. In examples in which the coupling 20, 22 is resettable, the energy absorber 30, 38 returns to the volume of the original state when the compressive load is released.

The energy absorber 30, 38 may be, for example, a compressible fluid. As an example, the energy absorber 30, 38 may include a liquid 80 and hydrophobic nanoporous particles 82 in the liquid 80. The compressible fluid is made of different substances that remain separate, e.g., a colloid or a suspension. For example, the energy absorber 30, 38 may be a colloid of the hydrophobic nanoporous particles 82 in the liquid 80. The liquid 80 may be any inert, i.e., nonreactive, liquid, e.g., water, lithium chloride, etc.

The particles 82 are nanoporous; in other words, the particles 82 have nanopores. The nanopores may have diameters on the order of 1 nm to 100 nm. The particles 82 may be, for example, silicon. The particles 82 are hydrophobic, that is, tending to repel water or resist mixture with water. The particles 82 may be a material that is hydrophobic, or the particles 82 may have a hydrophobic surface treatment, e.g., chlorotrimethylsilane or chlorodimethyloctylsilane in toluene.

Figure 8:
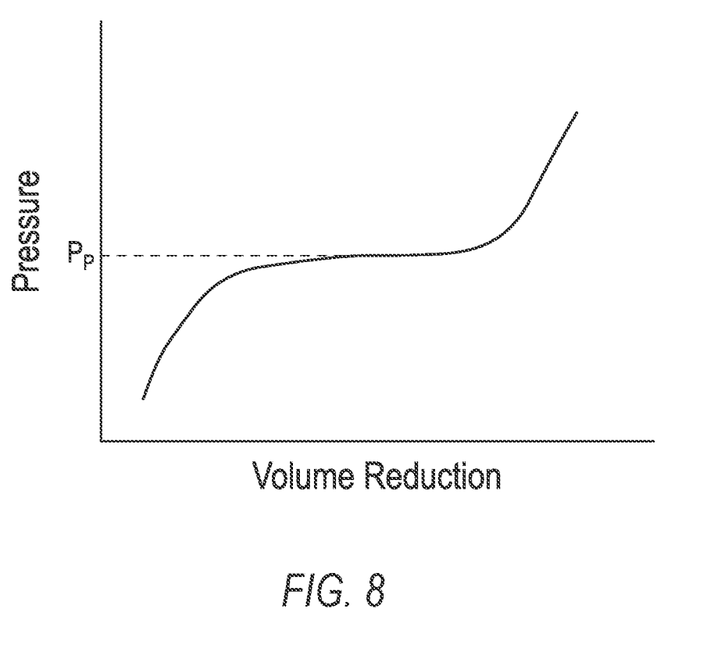
FIG. 8 is a graph of pressure in the energy absorber versus volume reduction.

FIG. 8 is a theoretical example of a curve describing the relationship between a volume reduction of the compressible fluid, e.g., the liquid 80 and particles 82, and a pressure experienced by the compressible fluid. As a volume occupied by the compressible fluid decreases, i.e., when the compressible fluid is compressed from the uncompressed state to the compressed state, the pressure initially increases relatively steeply. As the volume continues to decrease, the pressure nears a plateau pressure $P_P$ and does not increase or increases only relatively slowly, as shown over a plateau region of the curve. Over the plateau region, the slope of the curve, that is, the rate of change of pressure per unit of volume reduction, is less than the slope of other regions of the curve. The plateau pressure $P_P$ may be at an inflection point of the curve in the plateau region, that is, the point at which a change in the direction of curvature of the curve occurs, that is, a point separating a region of the curve with decreasing slope from a region of the curve with increasing slope. After the plateau region, as the volume continues to decrease, the pressure rises more quickly than in the plateau region.

Figure 5:
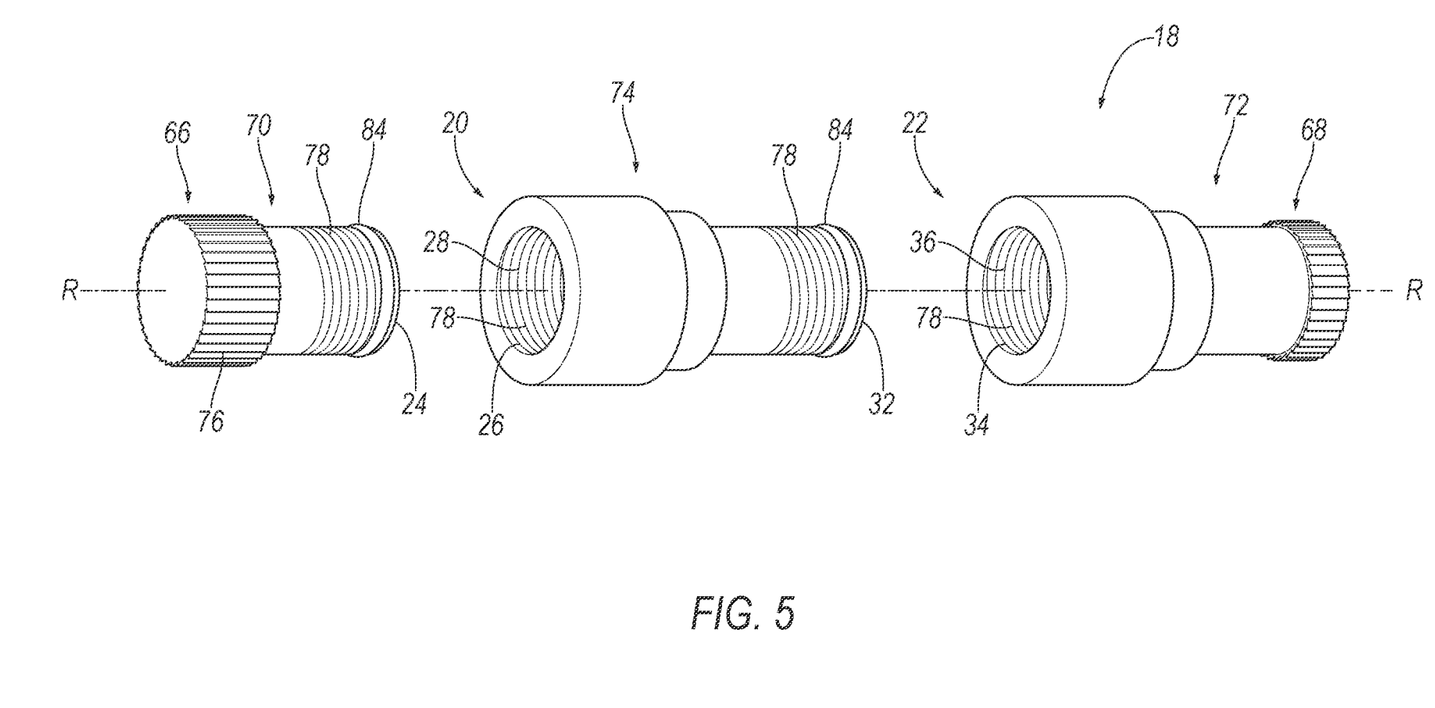
FIG. 5 is an exploded view of the load limiter.
Figure 6:
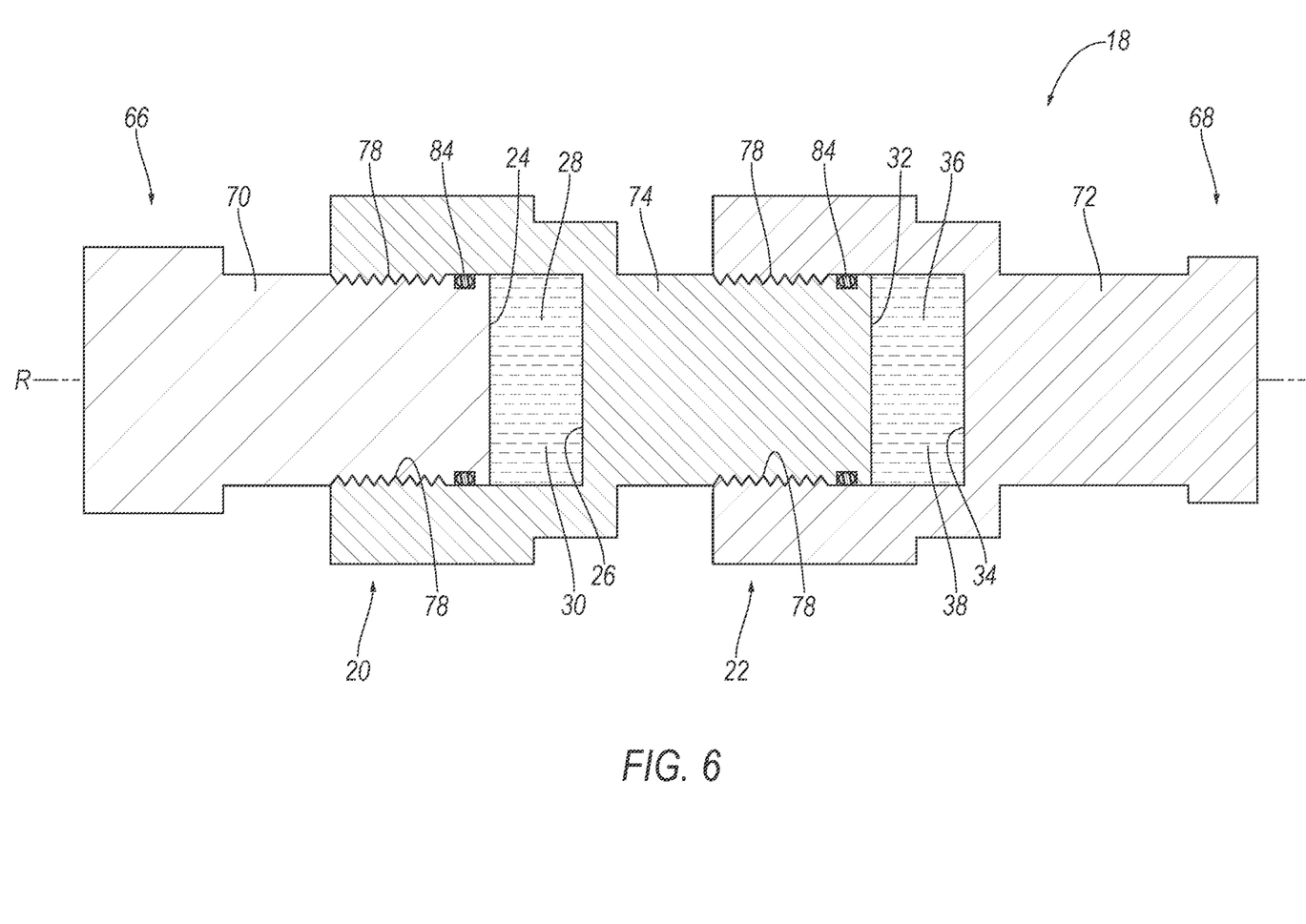
FIG. 6 is a cross-sectional view of the load limiter.
Figure 7A:
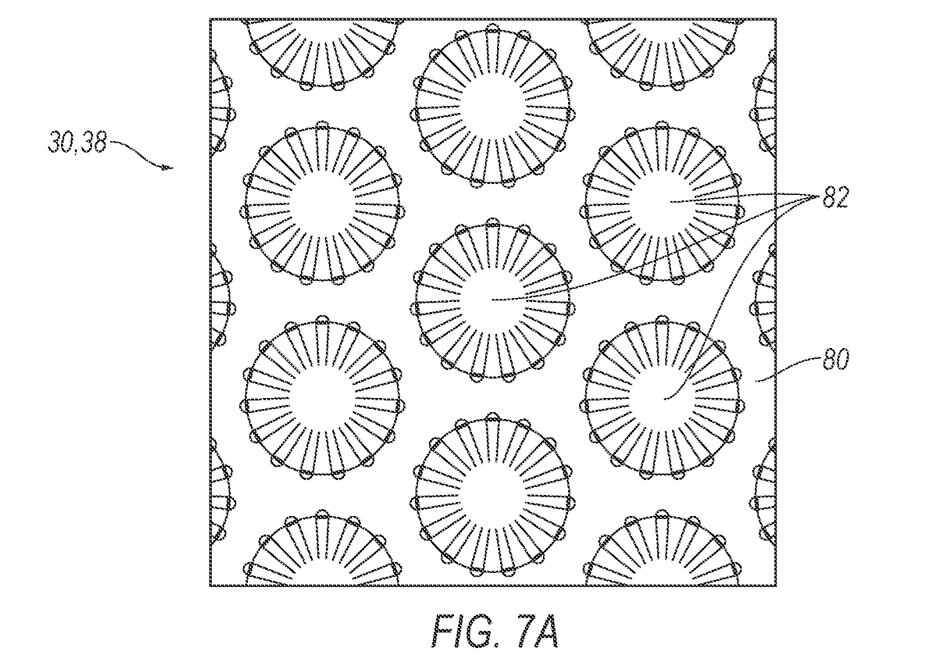
FIG. 7A is a diagram of an energy absorber of the load limiter an uncompressed state.
Figure 7B:
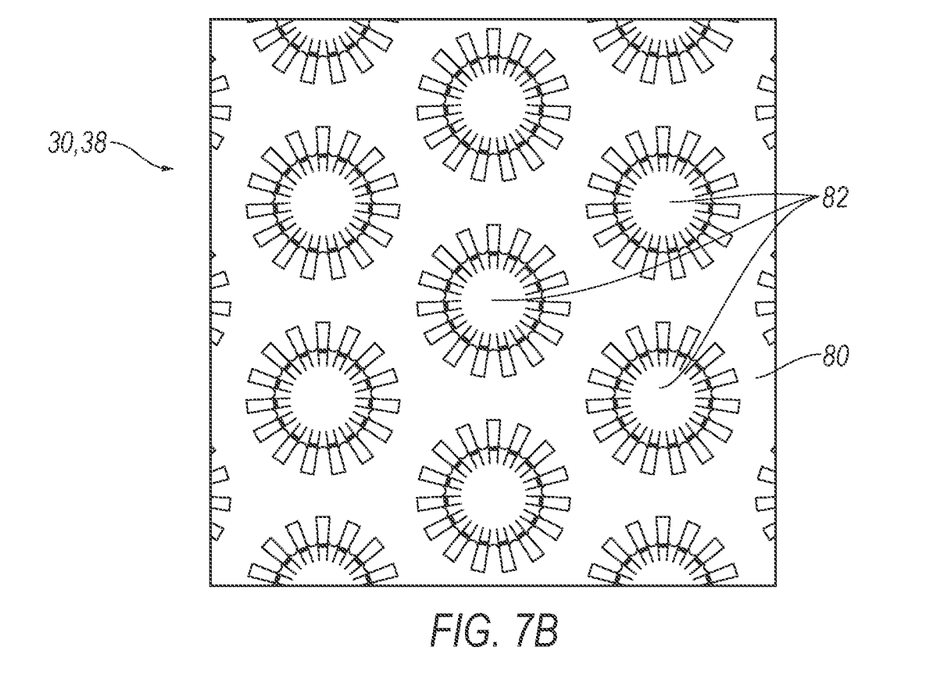
FIG. 7B is a diagram of the energy absorber in the compressed state.

With reference to FIGS. 5A-5B, physically, before the volume reduces, i.e., in the uncompressed state, air fills the nanopores of the particles 82, and surface tension prevents the liquid 80 from entering the nanopores, as shown in FIG. 5A. In the plateau region, i.e., in the compressed state, the pressure becomes sufficient to overcome the surface tension, and the liquid 80 enters the nanopores and compresses the air inside the nanopores, as shown in FIG. 5B. Once the nanopores are mostly full of the liquid 80, as the volume reduces, the pressure increases more substantially. The volume may be reduced by as much as 80%. The plateau pressure $P_P$ and the length of the plateau region are affected by the choice of material for the particles 82, the average size of the particles 82, the number of nanopores per particle, the average size of the nanopores, the surface treatment, and the choice of liquid 80.

The male segment 24, 32 is advanced into the respective female segment 26, 34 from the uncompressed position in which the nanopores are substantially filled with air to the compressed state in which the nanopores are substantially filled with the liquid 80, i.e., the compressed state. The volume of the energy absorber 30, 38 when the energy absorber 30, 38 is in the compressed state may be at most half of the volume, i.e., half or less than half of the volume, e.g., as little as 20% of the volume, of the energy absorber 30, 38 when the energy absorber 30, 38 is in the uncompressed state. As the male segment 24, 32 advances into the female segment 26, 34, the pressure in the energy absorber 30, 38 follows the curve in FIG. 8.

The couplings 20, 22 may have different compressive load thresholds. Accordingly the coupling 20, 22 may provide a progressive load limiting. Specifically, when the second end 68 of the load limiter 18 is locked to the housing 14 and force is exerted on the webbing 40, e.g. during a vehicle 10 impact, the webbing 40 may impart a compressive load on the energy absorbers 30, 38 of the couplings 20, 22 sufficient to compress the energy absorbers 30, 38. Since the couplings 20, 22, specifically the energy absorbers 30, 38, have different compressive load thresholds, the coupling 20, 22 with the lowest compressive load threshold will compress first and, in the event the loading on the load limiter 18 increases, the other coupling 20, 22 will compress next. These separate compressions provide two separate energy absorbing phases. In other words, the first end of the load limiter 18 will rotate relative to the second end 68 in response to first torsional load and the load limiter 18 will with stand rotation up to a second, higher, torsional load, at which point the first end of the load limiter 18 will rotate again relative to the second end 68. In examples including more than two couplings 20, 22, the load limiter 18 will have more than two energy absorbing phases.

Specifically, in the example shown in the figures, the first coupling 20 has a first compressive load threshold and the second coupling 22 has a second compressive load threshold higher than the first compressive load threshold. The first the first energy absorber 30 is compressible between the first male segment 24 and the first female segment 26 to a compressed position in response to compressive load between the first male segment 24 and the first female segment 26 that exceeds the first threshold. The second energy absorber 38 is compressible between the second male segment 32 and the second female segment 34 to a compressed position in response to compressive load between the second male segment 32 and the second female segment 34 that exceeds the second threshold. For example, in the example shown in the figures, the surface tension of the nanopores of the second energy absorber 38 is greater than the surface tension of the nanopores of the first energy absorber 30 such that the liquid 80 of the first energy absorber 30 enters the nanopores of the first energy absorber 30 under lower compressive load than that which causes the liquid 80 of the second energy absorber 38 to enter the nanopores of the second energy absorber 38.

The energy absorber 30, 38 is resiliently compressible between the first male segment 24 and the first female segment 26. Specifically, the energy absorber 30, 38 may be resettable such that, when the rotational force on the second end 68 of the load limiter 18 is released, the energy absorber 30, 38 forces the respective male segment 24, 32 to retreat from the respective female segment 26, 34 to the position before the application of the rotational force that exceeded the rotational force threshold. In the example shown in the Figures, the compression of the energy absorber 30, 38 may be partially or fully reversible such that, as the compressive load decreases, the air compressed in the nanopores expands, and the volume occupied by the energy absorber 30, 38 expands to drive the male segment 24, 32 to the uncompressed state.

The energy absorber 30, 38 is retained in the coupling 20, 22. Specifically, the energy absorber 30, 38 is. sealed in the respective cavity 28, 36 between the respective male segment 24, 32 and the respective female segment 26, 34. The cavity 28, 36 lacks outlets; in other words, no routes are provided for the energy absorber 30, 38 to escape the cavity. The energy absorber 30, 38 may include a seal 84 between the male segment 24, 32 and the female segment 26, 34 to seal the energy absorber 30, 38 in the cavity 28, 36. The seal 84 may be of any suitable type. As an example, the outer diameter of the male segment 24, 32 may be substantially equal to the inner diameter of the female segment 26, 34, such that the interface between the male segment 24, 32 and the female segment 26, 34 forms a seal relative to the energy absorbers 30, 38. In such an example, the cavity 28, 36 may not be airtight, but is sufficiently sealed to prevent escape of the energy absorber 30, 38. As another example, the coupling 20, 22 may include a sealant, e.g., an O-ring, between the male segment 24, 32 and the female segment 26, 34.

This disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seatbelt retractor comprising:
    a housing;
    a spool rotatably supported by the housing on a rotational axis;
    a load limiter fixed to the spool and lockable with the housing, the load limiter being on the rotational axis;
    the load limiter having a first coupling and a second coupling spaced from the first coupling along the rotational axis;
    the first coupling having a first male segment and a first female segment receiving the first male segment defining a first cavity therebetween, the first male segment and the first female segment being moveable relative to each other along the rotational axis;

the first coupling having a first energy absorber retained in the first cavity, the first energy absorber being compressible relative to the first male segment and the first female segment;

the second coupling having a second male segment and a second female segment receiving the second male segment defining a second cavity therebetween, the second male segment and the second female segment being moveable relative to each other along the rotational axis; and the second coupling having a second energy absorber retained in the second cavity, the second energy absorber being compressible relative to the second male segment and the second female segment.

2. The seatbelt retractor of claim 1, wherein the first male segment includes threads and the first female segment includes threads engaged with the threads of the first male segment.

3. The seatbelt retractor of claim 2, wherein the second male segment includes threads and the second female segment includes threads engaged with the threads of the second male segment.

4. The seatbelt retractor of claim 1, wherein the first energy absorber is resiliently compressible between the first male segment and the first female segment and the second energy absorber is resiliently compressible between the second male segment and the second female segment.

5. The seatbelt retractor as set forth in claim 1, wherein the first energy absorber is a compressible fluid sealed in the first cavity between the first male segment and the first female segment and the second energy absorber is a compressible fluid sealed in the second cavity between the second male segment and the second female segment.

6. The seatbelt retractor as set forth in claim 1, wherein the first energy absorber and the second energy absorber each include a liquid and hydrophobic nanoporous particles in the liquid.

7. The seatbelt retractor as set forth in claim 1, wherein the first energy absorber is compressible between the first male segment and the first female segment to a compressed position in response to compressive load between the first male segment and the first female segment that exceeds a first threshold, and the second energy absorber is compressible between the second male segment and the second female segment to a compressed position in response to compressive load between the second male segment and the second female segment that exceeds a second threshold, the second threshold being greater than the first threshold.

8. The seatbelt retractor as set forth in claim 1, wherein the load limiter includes a first member fixed to the spool and a second member lockable with the housing, the first coupling and the second coupling being between the first member and the second member.

9. The seatbelt retractor as set forth in claim 8, wherein the first member includes one of the first male segment or the first female segment and the second member includes one of the second male segment or the second female segment.

10. The seatbelt retractor as set forth in claim 9, wherein the load limiter includes an intermediate member between the first member and the second member, the intermediate member including the other of the first male segment or the female segment, and the intermediate member including the other of the second male segment or the second female segment.

11. The seatbelt retractor as set forth in claim 8, further comprising a locking device between the housing and a second member.

12. The seatbelt retractor as set forth in claim 1, wherein the load limiter includes a first member fixed to the spool, a second member lockable with the housing, and an intermediate member between the first member and the second member, the first coupling being between the first member and the intermediate member and the second coupling being between the second member and the intermediate member.

13. The seatbelt retractor as set forth in claim 12, wherein:
the first member includes one of the first male segment or the first female segment and the intermediate member includes the other of the first male segment or the first female segment; and
the second member includes one of the second male segment or the second female segment and the intermediate member includes the other of the second male segment or the second female segment.

14. The seatbelt retractor as set forth in claim 13, wherein the first energy absorber is a compressible fluid sealed in the first cavity between the first male segment and the first female segment and the second energy absorber is a compressible fluid sealed in the second cavity between the second male segment and the second female segment.

15. The seatbelt retractor as set forth in claim 14, wherein the first energy absorber and the second energy absorber each include a liquid and hydrophobic nanoporous particles in the liquid.

16. The seatbelt retractor as set forth in claim 12, wherein the first energy absorber is compressible between the first male segment and the first female segment to a compressed position in response to compressive load between the first male segment and the first female segment that exceeds a first threshold, and the second energy absorber is compressible between the second male segment and the second female segment to a compressed position in response to compressive load between the second male segment and the second female segment that exceeds a second threshold, the second threshold being greater than the first threshold.

* * * * *